United States Patent [19]

Hamal

[11] Patent Number: 5,041,710
[45] Date of Patent: Aug. 20, 1991

[54] CONVERSION CONVERGENT NOZZLE ASSEMBLY

[75] Inventor: E. E. Hamal, Mukilteo, Wash.

[73] Assignee: Cisco Safety, Inc., Mukilteo, Wash.

[21] Appl. No.: 329,793

[22] Filed: Mar. 28, 1989

Related U.S. Application Data

[63] Continuation-in-part of Ser. No. 142,074, Jan. 11, 1988, abandoned.

[51] Int. Cl.⁵ ............................................. B23K 9/173
[52] U.S. Cl. ..................................................... 219/70
[58] Field of Search .................. 219/70, 72, 74, 69.1, 219/136, 137.31, 137.42

[56] References Cited

U.S. PATENT DOCUMENTS

| | | | |
|---|---|---|---|
| 2,761,049 | 8/1956 | McElrath et al. | 219/157.52 |
| 2,833,913 | 5/1958 | Bernard | 219/137.43 |
| 2,952,766 | 9/1960 | Craig et al. | 219/137.42 |
| 3,265,856 | 8/1966 | Cecil | 219/137.9 |
| 3,270,178 | 8/1966 | Keller | 219/74 |
| 3,270,179 | 8/1966 | Russell | 219/74 |
| 3,463,902 | 8/1969 | Bircher | 219/137.42 |
| 3,470,345 | 9/1969 | Vaillancourt | 219/70 |
| 3,654,421 | 4/1972 | Streetman et al. | 219/70 |
| 4,049,943 | 9/1977 | Pratt | 219/136 |
| 4,142,086 | 2/1979 | Rotillo | 219/136 |
| 4,145,595 | 3/1979 | Keller et al. | 219/75 |
| 4,393,298 | 7/1983 | Frantzeb, Sr. | 219/137.42 |
| 4,624,410 | 11/1986 | Rogers | 239/83 |
| 4,731,518 | 3/1988 | Parmelee et al. | 219/137.42 |

FOREIGN PATENT DOCUMENTS

125376 7/1983 Japan ................................... 219/74

OTHER PUBLICATIONS

Arcair brochure, "Air Carbon Arc Manual Torches", Rev., 09/1983.
Bernard advertisement, "Let's Talk Maintenance and Downtime", 08/1987.
Exotechnology, Inc. brochure for Exo. Process, 12/1986.
L-Tec advertisement, "L-Tec Steps Up the Pulse", 08/1987.
Thermal Arc brochure, "Pak 3XR Plasma Cutting System", 12/1985.

*Primary Examiner*—Geoffrey S. Evans
*Attorney, Agent, or Firm*—Christensen, O'Connor, Johnson & Kindness

[57] ABSTRACT

A convergent nozzle assembly (10) includes a generally cylindrically-shaped nozzle (52) engaged over a diffuser (40) extending forwardly from the gooseneck (26) of a hand piece (22) of a continuous wire electrode (14), inert gas shielded arc welding unit (12). The nozzle (52) also extends over an electrically conductive tip (35) extending forwardly from the diffuser (40). The interior of the nozzle (52), being of a larger diameter than the exterior of the diffuser (40), defines an air or gas collection cavity (51) therebetween to receive pressurized air or gases through cross holes (50) to intersect the central bore (48) of the diffuser (40) with the collection cavity (51). A plurality of passageways (64) direct the pressurized air or gas from the collection cavity (51) forwardly to discharge such air or gas forwardly from the nozzle assembly (10) to converge with each other at approximately the location at which the endless wire electrode (14) intersects the workpiece being cut or gouged.

17 Claims, 6 Drawing Sheets

CONVERSION CONVERGENT NOZZLE ASSEMBLY

CROSS REFERENCE TO RELATED APPLICATION

This is a continuation-in-part of U.S. patent application Ser. No. 142,074, now abandoned.

TECHNICAL FIELD

The present invention concerns a nozzle assembly for use in metal cutting and gouging, and more particularly, a nozzle assembly to convert an inert gas shielded welding unit into an efficient arc cutting and arc gouging torch.

BACKGROUND OF THE INVENTION

One of the most common general purpose type of welding system utilizes a continuous wire electrode that is fed from a coil through a wire drive mechanism to push the wire electrode through the interior of a flexible cable, through a hand piece at the end of the cable and finally through an electrically conductive tip extending forwardly of the hand piece. The tip receives high amperage current from a power supply typically mounted on a cart, together with the wire drive mechanism and a reel of the consumable wire electrode. To shield the area being welded from atmospheric oxygen, an inert gas is also supplied through the cable assembly, the hand piece and discharged through a nozzle at the forward end of the hand piece as an annular skirt or cloud about the electrode tip. Commonly used inert gases include argon, helium and carbon dioxide. The annular stream of inert gas is supplied at a relatively low pressure, for instance at about 30 pounds per square inch and about 30 cubic feet per hour, which is sufficient to prevent the extraction from the ambient air of contaminants such as oxygen or nitrogen that can have a deleterious effect on the metal being welded. Examples of this type of welding system are disclosed by U.S. Pat. Nos. 2,761,049, 2,833,913, and 3,265,856.

When desiring to cut or gouge metal rather than weld metal, a different type of electric arc apparatus is employed. One common type of apparatus for this purpose is known as the arc-air torch. The arc-air torch utilizes an electrically charged electrode which may be in the form of a solid, stiff carbon electrode rod initially approximately one to two feet long and consumed during the cutting or gouging process. The rod is held within the jaws of a hand-held clamp to enable the welder to move the tip of the electrode along the cutting path. Compressed air, typically at about 60 to 100 pounds per square inch, is directed at the tip of the electrode to continually blow away the molten metal.

To both weld and cut metallic materials efficiently two different types of apparatus have been required, i.e., a gas shielded arc welder and an arc-air cutting torch. Heretofore, this has required an investment that often has been too large for small shops, farms and ranches, especially since these tools may not be used on a daily basis.

SUMMARY OF THE INVENTION

The present invention provides a novel nozzle assembly to efficiently and economically convert a continuous electrode wire, inert gas shielded arc welding unit into an arc cutting and gouging apparatus. The conversion nozzle assembly is composed of a longitudinal nozzle extending over a diffuser attached to the forward end of the gooseneck of the hand piece of the welding unit and also over an electrically conductive tip extending forwardly from the diffuser. The nozzle is threadably or otherwise securely connected to the rear portion of the diffuser. A collection cavity is either formed entirely by the diffuser or by exterior portions of the diffuser and interior portions of the nozzle for receiving pressurized air or gas which is supplied to the central bore of the diffuser, through which bore the electrode wire also passes. In the situation in which the collection cavity is cooperatively formed by the diffuser and nozzle, cross holes extend radially outwardly through the diffuser to direct the pressurized air or gas from the diffuser central bore to the collection cavity. A plurality of passageways extend longitudinally forwardly from the collection cavity through either the diffuser or nozzle, to terminate at outlet openings oriented to direct the jets of compressed air or gas flowing therethrough to converge at the electrode wire at a location in front of the nozzle assembly and blow away the molten metal.

In accordance with a further aspect of the present invention, at least portions of the nozzle assembly are composed of electrically insulating materials to insulate the exterior of the nozzle from the electrically conducting diffuser and contact tip. This is desirable not only for the safety of the operator, but also to avoid the creation of a closed electrical circuit when the exterior of the nozzle assembly touches against a workpiece.

In accordance with another aspect of the present invention, the nozzle is essentially in the form of an elongate cylindrical member having a separate rearward collar member disposed between the interior diameter of the cylindrical member and the exterior diameter of the diffuser thereby to secure the nozzle assembly to the diffuser. A relatively large counterbore is formed in the rearward portion cylinder to receive the collar and to define the collection cavity between the inside diameter of the nozzle and the outside diameter of the diffuser at a location forwardly of the collar. A smaller diameter bore extends longitudinally through the forward portion of the cylindrical member to snugly engage over the forward portion of the diffuser and the electrically conductive tip.

In accordance with yet another aspect of the present invention, the nozzle assembly includes a rearward cylinder having an inside diameter larger than the width or exterior diameter of the diffuser thereby to define a collection cavity between the exterior of the diffuser and the inside diameter of the cylinder. The cylinder is secured to the diffuser by a collar positioned rearwardly of the cross holes formed in the diffuser through which compressed air or gas is transmitted to the collection cavity from the hollow interior of the diffuser. The collar snugly engages over the rear exterior portion of the diffuser and snugly engages within the rear interior portion of the cylinder. The nozzle assembly also includes a forward, generally frustoconically-shaped nose detachably connected to the forward end of the rearward cylinder. The interior of the rearward portion of the nose is also hollow in construction to form a continuation of the collection cavity defined by the interior of the cylinder. A plurality of relatively small passageways extend forwardly from the hollow rear portion of the nose to discharge the compressed air or gas in forwardly directed jet streams. Preferably, the passageways are oriented to converge the air jet streams inwardly in the forward direction to cause them to intersect at a point somewhat forwardly of the nozzle assembly thereby to concentrate the jet streams at approximately the forward tip of the wire electrode in the molten metal puddle.

BRIEF DESCRIPTION OF THE DRAWINGS

The details of typical embodiments of the present invention will be described in connection with the accompanying drawings, in which.

DETAILED DESCRIPTION OF THE INVENTION

Figure 1:
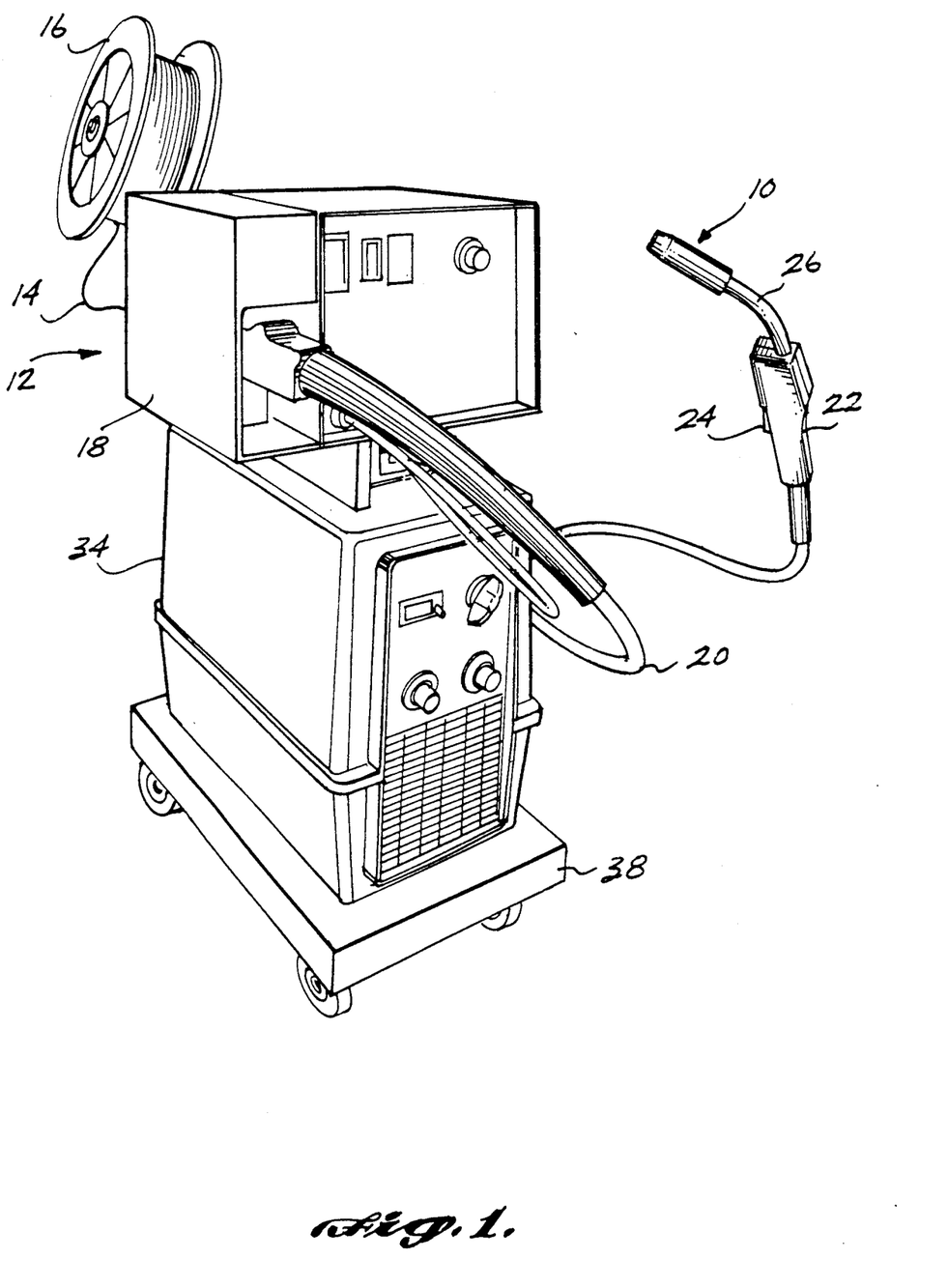
FIG. 1 is a pictorial view of a typical continuous wire electrode, inert gas shielded welding unit which is converted into an arc cutting and gouging torch through the use of the present invention.

Referring initially to FIG. 1, a nozzle assembly 10 constructed according to the present invention is utilized to convert typical continuous wire electrode inert gas shielded welding units, such as a welding unit 12, into an arc cutting or gouging torch. The typical inert gas shielded welding unit 12 includes a thin, continuous wire electrode 14 wound on a spool 16. The wire electrode 14 is fed from the spool 16 through a wire drive mechanism 18 to push the wire through the center of a flexible cable 20 that terminates at a manually graspable hand piece 22. The hand piece 22 includes a trigger 24 for feeding the wire electrode 14 through the cable 20 when desired. A curved gooseneck 26 is attached to the forward end of the hand piece 22 to direct the wire electrode 14 from the hand piece and into the nozzle assembly 10 of the present invention. The cable 20, hand piece 22 and gooseneck 26 all have a hollow central interior or bore 30 through which the wire electrode 14 is fed, and which interior is large enough to also route therethrough an inert shielding gas, such as argon, helium or carbon dioxide. In addition, the cable 20, hand piece 22 and gooseneck 26 include internal electrically conductive members 32 to route high amperage current from a power supply 34 to an electrically conductive tip 36 disposed within the forward end of the nozzle assembly 10. The flow of the shielding gas and the supply of the high amperage current to the electrically conducted contact tip 36 are also controlled by the trigger 24. As illustrated in FIG. 1, the power supply 34, the wire feed mechanism 18 and the wire spool 16 may all be mounted on a wheeled cart 38 for ease of movement from location to location.

The foregoing description of a typical continuous wire electrode inert gas shielded welding unit is merely illustrative of such units and is not inclusive of the types of such welding units with respect to which the present invention may be utilized. Such welding units are known in the art and do not per se constitute the present invention.

Figure 2:
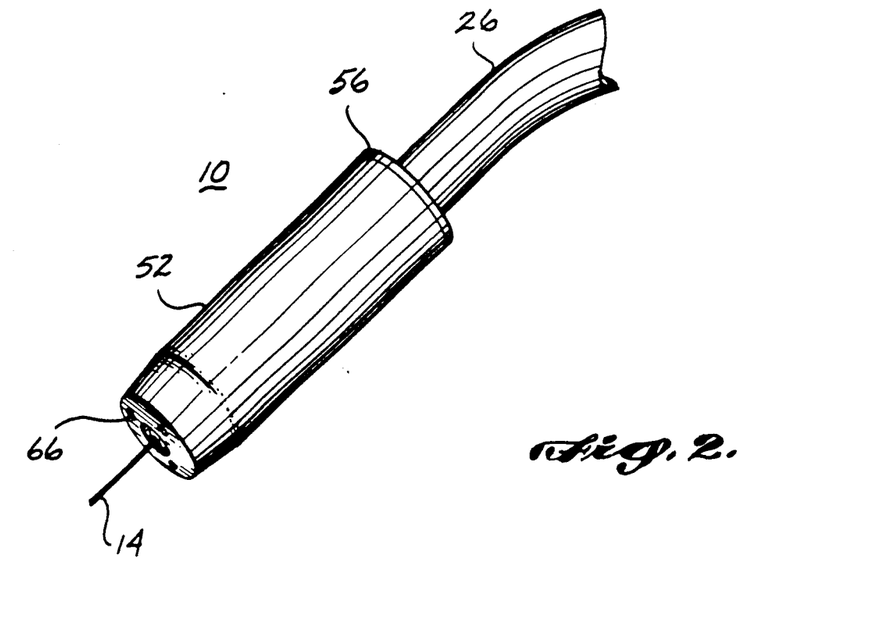
FIG. 2 is a pictorial view of a conversion nozzle assembly constructed according to the present invention.
Figure 4:
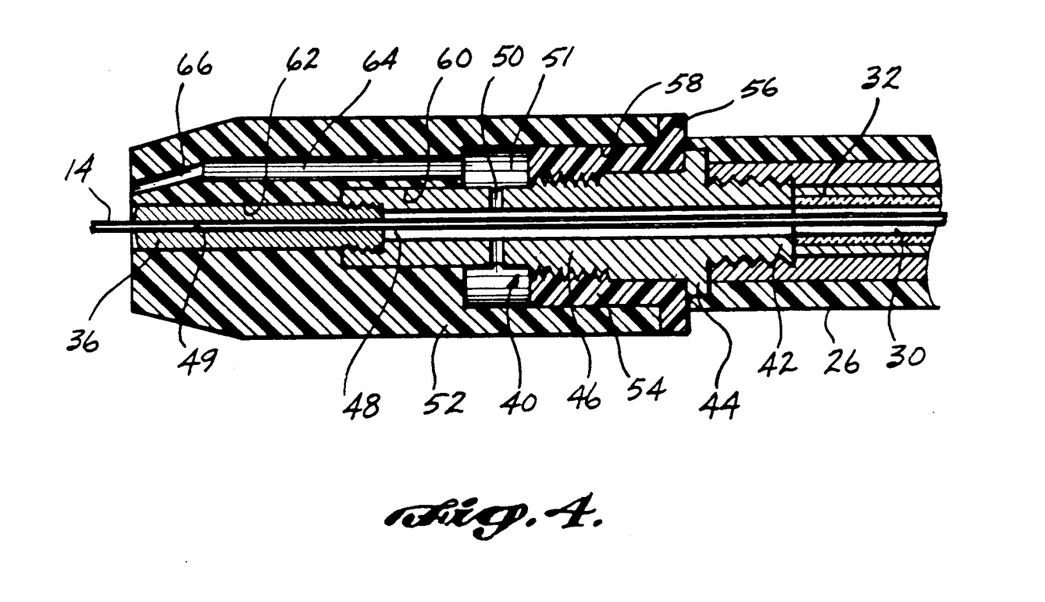
FIG. 4 is a cross-sectional view of the conversion nozzle assembly illustrated in FIG. 2.
Figure 5:
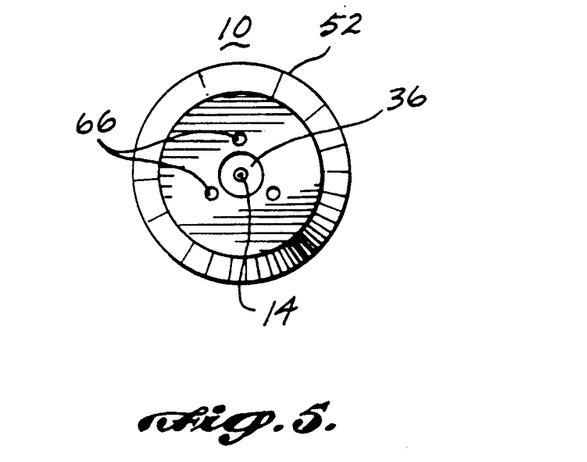
FIG. 5 is a front view of the conversion nozzle assembly illustrated in FIGS. 2 and 4.

Next referring specifically to FIGS. 2, 4 and 5, the conversion assembly 10 is constructed with an elongated, electrically conductive diffuser member 40 having a threaded connection section 42 extending rearwardly from a flange 44 to threadably engage within the correspondingly threaded interior of the forward end portion of the gooseneck 26. The diffuser 40 includes a major shank section 46 extending forwardly from the flange 44 to threadably engage with the rearward end portion of the electrically conductive tip 36. As illustrated in FIG. 4, the central interior 48 of the diffuser 40 is hollow or in the form of a central bore to receive both the wire electrode 14 and the inert shielding gas flowing through the central interior of the gooseneck. As such, the diffuser interior 48 is of a diameter somewhat larger than the outer diameter of the wire electrode 14. The conductive tip 36 also includes a central bore 49 extending therethrough, however, of a size smaller than the bore 48 formed in the diffuser member 40 so as to closely and slidably receive the wire electrode 14, but to prevent leakage of any appreciable volume of the gas or air.

A plurality of cross holes 50 are formed in the shank section 46 of the diffuser 40 to direct the shielding gas from the central bore 48 of the diffuser and into a collection cavity 51 defined by the exterior of the diffuser and the interior portions of a generally cylindrically-shaped nozzle 52 which extends forwardly from the gooseneck 26 to approximately the forward end of the contact tip 36. The nozzle 52 is attached to the diffuser 40 by a collar 54 that is snugly and threadably engaged with the portion of the shank section 46 extending rearwardly from the collection cavity 51 to the diffuser flange 44. The collar 54 includes a rear flange 56 which abuts against the rear end of the nozzle 52 and against the adjacent forward surface of the diffuser flange 44. The outer diameter of the collar 54 snugly engages within a counterbore 58 formed in the rearward portion of the nozzle 52, which counterbore also defines the collection cavity 51. The nozzle 52 includes a second smaller diameter counterbore 60 which snugly receives the shank section 46 of the diffuser 42 located forwardly of the cross holes 50 and the collection cavity 51. The nozzle 52 is formed with a third, central bore section 62 which snugly receives the electrically conductive tip 36 therein.

A plurality of air or gas passageways 64 extend through the nozzle 52 forwardly from the collection cavity 51 and then angle inwardly at forward portions 66 thereby to discharge gaseous jets in streams that converge toward the wire electrode 14 at a location forwardly of the nozzle assembly 10. Ideally this convergence location corresponds to the location at which the metal being cut or gouged is in a molten state, i.e., the location of the arc existing between the wire electrode 14 and the workpiece. Although three passageways 64 are illustrated in FIGS. 4 and 5, it is to be understood that the number of passageways may be increased or decreased to accommodate various factors, such as the type and size of the electrode wire 14 being utilized, the thickness and composition of the workpiece being cut or gouged, the amperage of the current supplied to the electrode, etc.

Ideally nozzle 52 and collar 54 are at least in part constructed from electrically nonconductive, heat resistant material thereby to insulate the electrically conducting diffuser 46 and tip 36 from the exterior of the nozzle assembly 10. Examples of such nonconductive, heat resistant materials may include, for instance, plastics such as nylon, or nonconductive ceramics.

In operation, the inert gas shielding nozzle (not shown) which is employed when the unit 12 is used for welding, is detached from the gooseneck 26 and replaced with the conversion convergent nozzle assembly 10 of the present invention to provide a convergent gas or air stream that removes molten metal from the arc puddle. If the welding nozzle utilizes a diffuser and conductive tip similar to the diffuser 46 and conductive tip 36 shown in FIG. 4, then these components of the welding nozzle may also be employed as part of the conversion convergent nozzle assembly 10 of the present invention. This reduces the number of new components required to construct the conversion convergent nozzle assembly 10.

To employ the unit 12 as a cutting or gouging tool, the same wire electrode used during welding may be used during the arc cutting or gouging process. As an example, tubular wire electrodes are commonly employed for welding. Such electrodes have a center core composed of the same base material from which the components being welded are composed. During the arc cutting or gouging process, use of such tubular wire electrodes provides increased metal removal by producing a larger, more fluid molten puddle. As an alternative, a continuous solid wire, tubular gas-producing filler or carbon-filled wire electrode may be used for the arc cutting or gouging process.

Also, in the present invention, either welding polarity, REP (reverse polarity-electrode positive) or SEN (straight polarity-electrode negative) may be used. SEN will, however, provide a larger welding puddle for metal gouging or cutting than provided by REP. The metal removal rate may be maximized by increasing the operating voltage to the maximum level available from the welding power supply 34.

To provide the converging jet stream for blowing molten metal away from the tip of the electrode, the same inert gas used during the welding process may be employed or the inert gas supply may be disconnected from the unit 12 and replaced with compressed air, for instance, from a standard air compressor. If the inert welding gas is used, the supply pressure of the gas may have to be increased somewhat to generate a stream of gas of sufficient velocity to remove the molten metal. This generally is not a problem if compressed air is used, for instance, from the shop supply air, in that such air is typically in the range of from 80 to 100 pounds per square inch. It will be appreciated that most likely the use of compressed air will be less expensive than if the inert shielding gas is used. However, if the amount of metal to be cut or removed is quite small, this cost differential may not be significant. Further, in conjunction with the present invention, the use of reactive gases, such as oxygen, nitrous oxide or flammable fuels, should be avoided to prevent uncontrolled reactions during the cutting or gouging process.

With the foregoing minimal changes, the unit 12 is ready to be used as a cutting and gouging tool with the compressed air or inert gas flowing through the center of the cable 20, hand piece 22, gooseneck 26 and into the central bore 48 of the diffuser 40. From the central bore 48, the compressed air or inert gas is transmitted to the collection cavity 51 through the radial cross holes 50 extending through the shank section 46 of the diffuser 40. From the collection cavity 51, the compressed air or inert gas flows forwardly through the passageways 64 and then out through the forward portions 66 of the passageways to converge into a single stream at the location of the molten metal thereby to blow the molten metal away from the tip of the electrode wire 14.

It will be appreciated that by virtue of the present invention, a typical inert gas shielded welding unit utilizing an endless wire electrode may be conveniently and very economically converted into an efficient arc cutting or gouging tool. As such, it is not necessary for small shops, farms, ranches, etc. to invest in both a gas shielded welding unit and a separate arc or other metal removal torch or mechanism.

Figure 3:
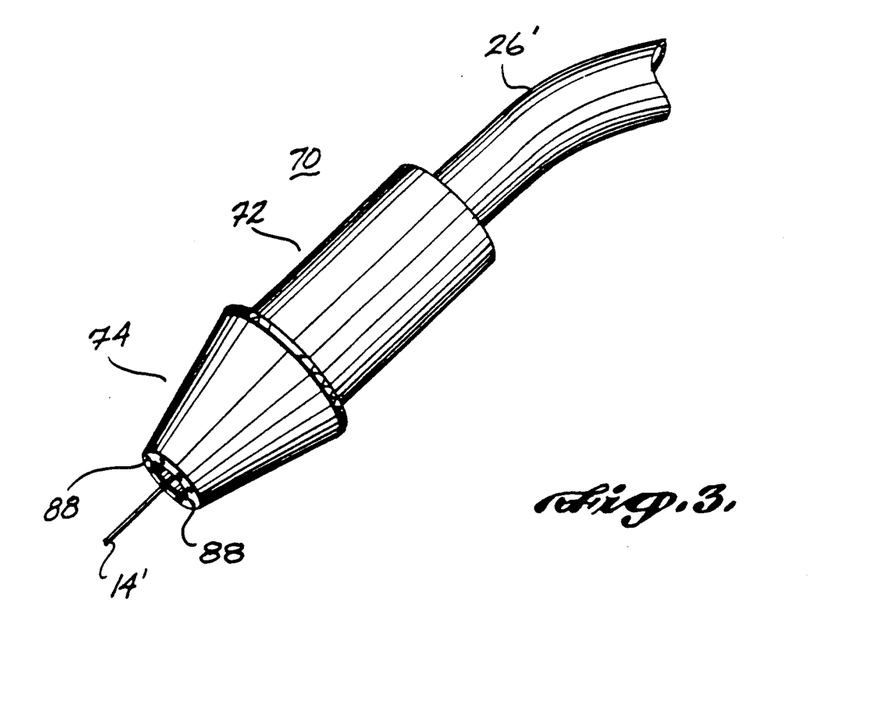
FIG. 3 is a pictorial view of a second preferred embodiment of a conversion nozzle assembly constructed according to the present invention.
Figure 6:
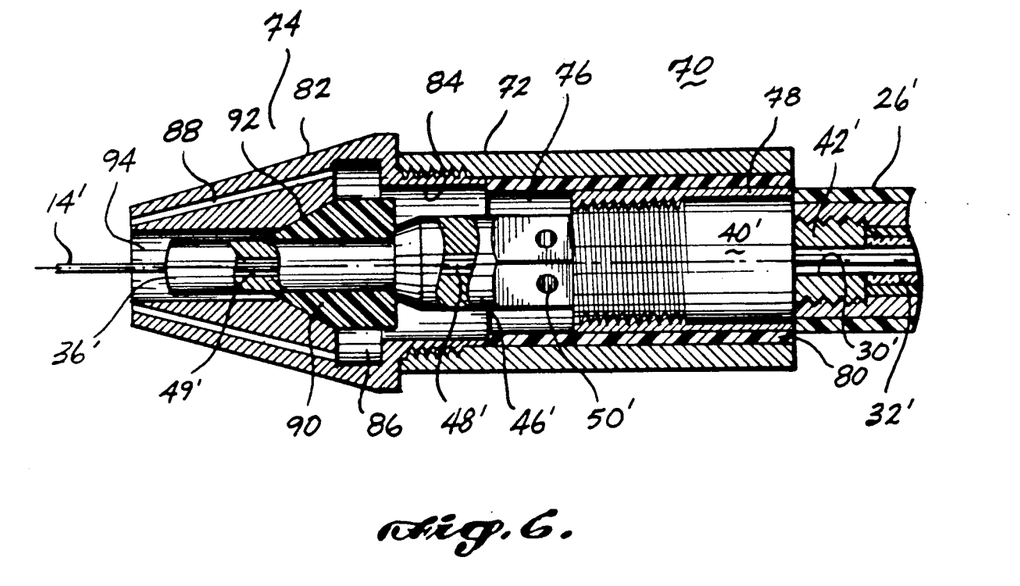
FIG. 6 is a cross-sectional view of the conversion nozzle assembly illustrated in FIG. 3.
Figure 7:
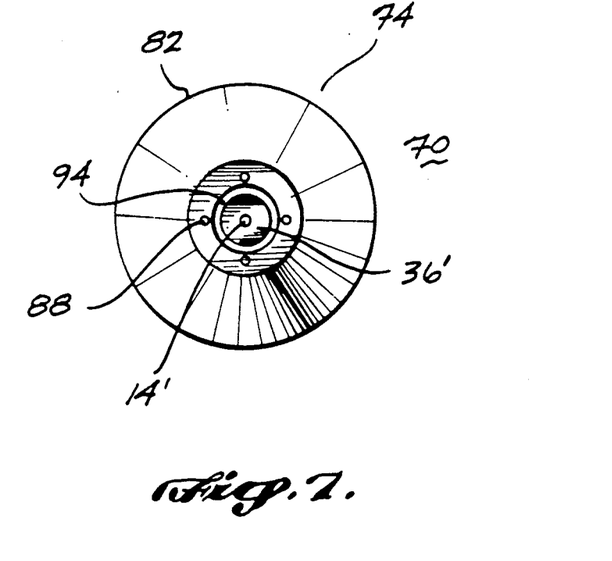
FIG. 7 is a front view of the conversion nozzle assembly shown in FIGS. 3 and 6.

A further embodiment of the present invention is illustrated in FIGS. 3, 6, and 7 wherein the components comparable to those shown in FIGS. 2, 4, and 5 are indicated with the same part numbers but with the addition of a "prime" designation. To avoid repetition, the construction of these particular components will not be repeated.

FIGS. 3, 6 and 7 illustrate a nozzle assembly 70 having a rearward cylindrical portion 72 extending forwardly from the gooseneck 26' to threadably engage with a forward nose assembly 74 which extends slightly forwardly of the forward end of the contact tip 36'. As shown in FIG. 6, the cylindrical portion 72 extends along the nozzle assembly 70 forwardly from the gooseneck 26' approximately to the location at which the diffuser shank 46' intersects the contact tip 36'. Further, the inside diameter of the cylindrical portion 72 is larger than the exterior diameter or width of the diffuser shank section 46' thereby to define a collection cavity 76 adjacent cross holes 50'. The cylindrical portion 72 is secured to the rear connector portion 42' of the diffuser 40' by a collar 78 which snugly and threadably engages with both the threaded and unthreaded sections of the rear connector portion 42'. An electrically insulating sleeve 80 is disposed between the outside diameter of collar 78 and an inside diameter of cylinder portion 72 thereby to electrically insulate the cylinder portion from the gooseneck end 26' and diffuser shank 46'.

The nose assembly 74 includes an exterior, generally frustoconically-shaped nose 82 having a hollow, rearwardly extending pilot hub 84 formed with external threads to engage with the internal threads formed in the forward end portion of the cylinder 72. The interior portion of the pilot hub 84 forms an extension of the collection cavity 76 and intersects with a cavity section 86 formed in the rearward or base portion of nose 82. A plurality of air or gas passageways 88 extend forwardly from the cavity section 86 to break through the forward end of the nose 82 so that the pressurized air or gas disposed within the collection cavity 76 and the cavity section 86 is discharged from the passageways in discrete jets that converge toward the wire electrode 14' at a location somewhat in front of the forward end of the nose assembly 70. Although four passageways 88 are illustrated in FIGS. 6 and 7, it is to be understood that their number may be increased or decreased depending upon various factors, such as the diameter of the passageways, the size of the wire electrode 14' being utilized, the type of metal being cut or gouged, the amperage of the electrical current being applied to the electrode, the arc voltage, etc.

The nose assembly 74 also includes a spacer in the form of an air-sealing insulator 90 having a generally circularly-shaped rearward section abutting against the forward end of the diffuser shank 46' and a frustoconically-shaped forward section bearing against a correspondingly-shaped seat 92 formed within the interior of the nose 82 to form an airtight seal therebetween. At its forward end, the seat 92 intersects with a longitudinal bore 94 formed in the forward interior portion of the nose 82 to provide clearance for the contact tip 36'. Ideally, the spacer/air-sealing insulator 90 is composed at least in part of electrically insulating material to insulate the nose 82 from the contact tip 36'. The spacer also serves to prevent air or gas in cavity 86 from leaking into bore 94.

As discussed above with respect to nozzle assembly 10, if the welding unit 12 includes a diffuser and contact tip similar to the diffuser 40' and tip 36' shown in FIG. 6, then the nozzle assembly 70 of the present invention may utilize these components. The same is true if the welding unit includes a cylindrical portion and an attachment collar similar to the cylindrical portion 72 and the collar 78 shown in FIG. 6. Moreover, the nozzle assembly 70 functions in essentially the same manner as the nozzle assembly 10 discussed above, and as such, provides the same efficiencies and other advantages provided by the nozzle assembly 10.

Figure 8:
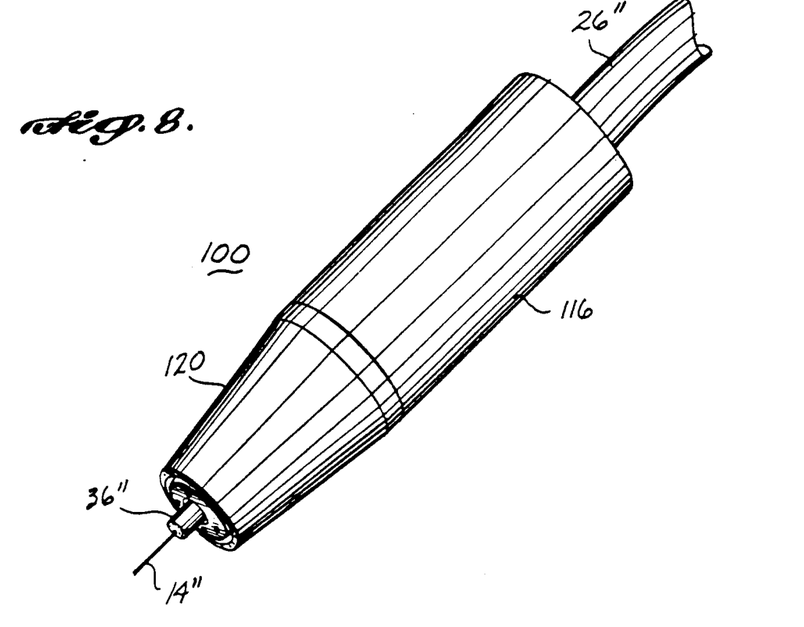
FIG. 8 is a pictorial view of another preferred embodiment of the conversion nozzle assembly constructed according to the present invention.
Figure 9:
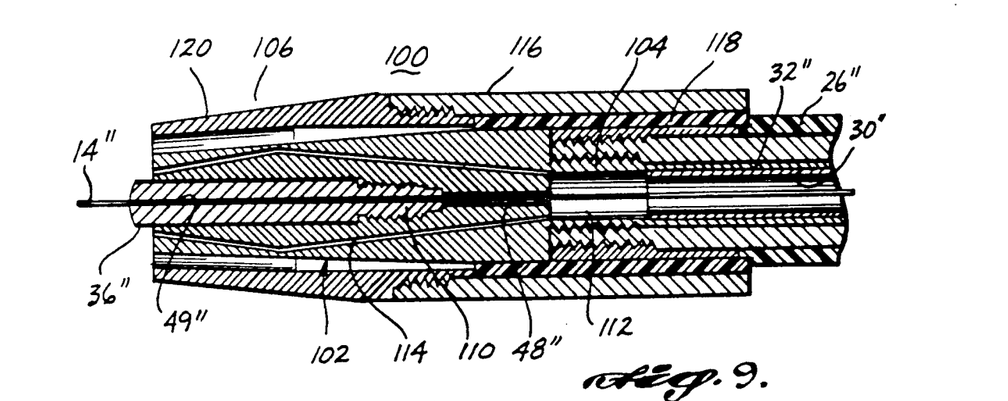
FIG. 9 is a cross-sectional view of the conversion nozzle assembly illustrated in FIG. 8.
Figure 10:
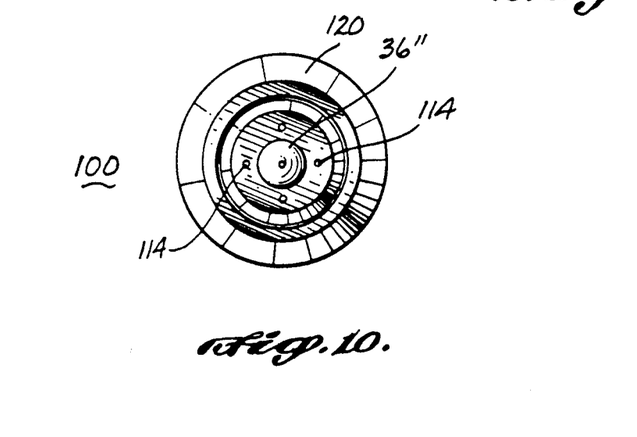
FIG. 10 is a front view of the conversion nozzle assembly shown in FIGS. 8 and 9; and, FIG. 11 is a cross-sectional view of a further preferred embodiment of the present invention.

Another preferred embodiment to the present invention is illustrated in FIGS. 8, 9 and 10, wherein components comparable to those in FIGS. 1-7 are indicated with the same number but with the addition of a "double prime"(″) designation. To avoid repetition, the construction of these particular components will not be repeated. FIGS. 8, 9 and 10 illustrate a conversion convergent nozzle assembly 100 constructed with an elongated, electrically conductive diffuser 102 having a rearward, reduced diameter connection section 104 to threadably engage within the correspondingly threaded interior of the forward end portion of the gooseneck 26″. The diffuser extends forwardly from the gooseneck 26″ within the interior of a surrounding nozzle assembly 106. The diffuser 102 is formed with a forward counterbore 108 for closely receiving an electrically conductive tip 36″ that extends slightly forwardly of the forward end of the diffuser. The tip is constructed with a reduced diameter rearward threaded portion 110 to engage a correspondingly threaded portion of the central interior of the diffuser. A small diameter bore 49″ extends longitudinally through the center of the conductive tip 36″ for closely and slidably receiving the electrode wire 14″.

Figure 11:
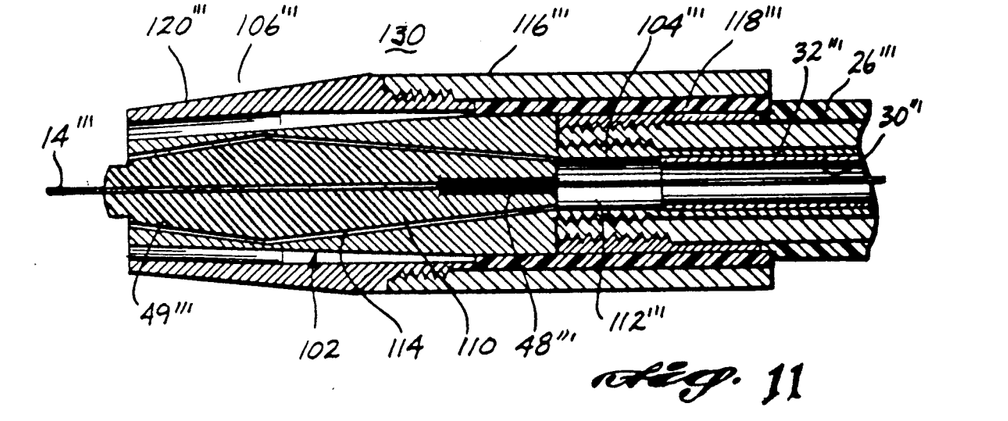

As illustrated in FIG. 11, diffuser and electrically conductive tip may be constructed as one integral unit 128 of electrically conductive material. Other than this difference, the convergent conversion nozzle assembly 130 shown in FIG. 11 is the same as that shown in FIGS. 8-10, and thus, like parts are given the same part number but with a triple prime (‴) designation. One advantage of constructing difusser 102 and tip 36″ as separate components is that commercially available tips corresponding to tip 36″ may be utilized in conjunction with the present invention.

The diffuser 102 is formed with a rear counterbore 112 in the region of the connection section 104. The counterbore 112 is of a diameter larger than the central bore 30″ of the gooseneck 26″ thereby to serve as a collection cavity for the air or gas flowing through the center of the gooseneck and also to permit passage of the wire electrode 14″ which then extends through a smaller diameter bore section 48″ of the diffuser of a size somewhat larger than the outer diameter of the wire electrode 14″. The wire electrode 14″ next enters the central bore 49″ extending through the conductive tip 36″, which bore size preferably is smaller than the bore 48″ formed in a diffuser so as to closely and slidably receive the wire electrode 14″, but to prevent leakage of any appreciable volume of the gas or air received from the gooseneck 26″.

A plurality of relatively small diameter air/gas passageways 114 extend forwardly from the diffuser collection cavity 112 to discharge from the diffuser gas/air jets in streams that converge toward the wire electrode 14″ at a location forwardly of the nozzle assembly 100. Ideally this convergence location corresponds to the location in which the metal being cut or gouged is in a molten state thereby to efficiently and effectively blow the molten metal away from the workpiece. In the rearward portion of the diffuser, the passageways 114 initially are angled outwardly away from the longitudinal center of the diffuser and then in the forward portion of the diffuser, the passageways are angled inwardly toward the longitudinal center of the diffuser thereby to direct the air/gas streams in the desired converging pattern. Although four passage ways 114 are illustrated in FIGS. 9 and 10, it is to be understood that the number of passageways may be increased or decreased to accommodate various factors, such as the type and size of the electrode wire 14″ being utilized, the thickness and composition of the work piece being cut or gouged, and amperage of the current supply to the electrode, etc.

The nozzle assembly 106 includes a rearward cylindrical section 116 which is snugly engaged over the rear portion of the diffuser 102 and the forward portion of the gooseneck 26″ through the intermediacy of an insulating sleeve 118 composed of electrically nonconductive material in a manner similar to collar 54 and sleeve 80 thereby to electrically insulate the nozzle assembly 106 from the diffuser. The nozzle assembly also includes a forward section 120 threadably engagable with the leading end of the nozzle rear section 116. Ideally the front of the forward section 120 corresponds with the front of the diffuser 102, as shown in FIGS. 8 and 9.

The nozzle assembly 100 shown in FIG. 10 though different in construction from those shown in FIGS. 1-7, provides the same efficiencies and numerous other advantages provided by the nozzle assemblies 10 and 70.

As will be apparent to those skilled in the art to which the invention is addressed, the present invention may be embodied in forms other than those specifically disclosed above without departing from the spirit or scope of the present invention. The particular embodiments of the nozzle assemblies 10, 70, 100 and 130 set forth above are therefore to be considered in all respects as illustrative and not restrictive. The scope of the present invention is as set forth in the appended claims rather than be limited to the examples of the nozzle assemblies 10, 70, 100 and 130 described in the foregoing description.

The embodiments of the invention in which an exclusive property or privilege is claimed are defined as follows:

1. A conversion convergent nozzle assembly to convert an inert gas shielded welding unit into an arc cutting and gouging torch, comprising:
   (a) an elongate diffuser having a longitudinal, central bore sized to permit passage of a continuous wire electrode and a stream of gas from a remote source sufficient to blow molten metal away from the location of the cutting or gouging with the torch;
   (b) an electrically conductive contact tip having a central bore in communication with the central bore of the diffuser and sized to slidably and closely receive the wire electrode;
   (c) a longitudinal nozzle extending over the diffuser;
   (d) a collection cavity formed within the diffuser for receiving the gas stream from the remote source;
   (e) a plurality of gas passageways extending longitudinally forwardly from the collection cavity and through the diffuser to terminate at outlet openings oriented to direct the individual gas streams flowing through the diffuser toward a convergence point located forwardly of the nozzle assembly to blow molten metal away from the location of the cutting or gouging with the torch; and,
   (f) wherein the diffuser and the contact tip are constructed as a singular member.

2. A convergent nozzle assembly, to convert an inert gas shielded welding unit into an arc cutting and gouging torch, the conversion convergent nozzle assembly comprising:
   (a) a cylindrical diffuser having a central bore sized to permit passage of a continuous wire electrode and a stream of gas from a remote source sufficient to blow molten metal away from the location of cutting or gouging with the torch;
   (b) an electrically conductive contact tip extending forwardly from the diffuser, the contact tip having a central bore sized to slidably and closely receive the wire electrode;
   (c) a longitudinal nozzle extending over the diffuser and the contact tip;
   (d) a collection cavity formed at least partially by the diffuser for receiving the gas stream from the remote source; and,
   (e) a plurality of gas passageways extending longitudinally forwardly from the collection cavity, the gas passageways having outlet openings oriented to direct the individual gas streams flowing through the gas passageways toward a convergence point located forwardly of the nozzle assembly, and wherein the gas passageways include rear sections in gas receiving communication with the collection cavity and forward sections angled inwardly in the forward direction.

3. The conversion convergent nozzle assembly according to claim 2, wherein the gas passageways extend longitudinally through the diffuser.

4. The conversion convergent nozzle assembly according to claim 3, wherein the collection cavity is formed within the diffuser.

5. The conversion convergent nozzle assembly according to claim 4, wherein the diffuser and the contact tip are constructed as a singular member.

6. A convergent nozzle assembly, to convert an inert gas shielded welding unit into an arc cutting and gouging torch, the conversion convergent nozzle assembly comprising:
   (a) a cylindrical diffuser having a central bore sized to permit passage of a continuous wire electrode and a stream of gas from a remote source sufficient to blow molten metal away from the location of cutting or gouging with the torch;
   (b) an electrically conductive contact tip extending forwardly from the diffuser, the contact tip having a central bore sized to slidably and closely receive the wire electrode;
   (c) a longitudinal nozzle extending over the diffuser and the contact tip;
   (d) a collection cavity formed at least partially by the diffuser for receiving the gas stream from the remote source;
   (e) a plurality of gas passageways extending longitudinally forwardly from the collection cavity, the gas passageways having outlet openings oriented to direct the individual gas streams flowing through the gas passageways toward a convergence point located forwardly of the nozzle assembly; and,
   (f) wherein the diffuser and the contact tip are constructed as a singular member.

7. A convergent nozzle assembly, to convert an inert gas shielded welding unit into an arc cutting and gouging torch, the conversion convergent nozzle assembly comprising:
   (a) a cylindrical diffuser having a central bore sized to permit passage of a continuous wire electrode and a stream of gas from a remote source sufficient to blow molten metal away from the location of cutting or gouging with the torch;
   (b) an electrically conductive contact tip extending forwardly from the diffuser, the contact tip having a central bore sized to slidably and closely receive the wire electrode;
   (c) alongitudinal nozzle extending over the diffuser and the contact tip;
   (d) a collection cavity formed at least partially by the diffuser for receiving the gas stream from the remote source;
   (e) a plurality of gas passageways extending longitudinally forwardly from the collection cavity, the gas passageways having outlet openings oriented to direct the individual gas streams flowing through the gas passageways toward a convergence point located forwardly of the nozzle assembly;
   (f) a further comprising means for attaching the nozzle to the diffuser at a location spaced from the collection cavity; and,
   (g) wherein the nozzle includes portions forming a gas tight seal with the diffuser at a location spaced from the collection cavity in the direction opposite to the attaching means.

8. A convergent nozzle assembly, to convert an inert gas shielded welding unit into an arc cutting and gouging torch, the conversion convergent nozzle assembly comprising:
   (a) a cylindrical diffuser having a central bore sized to permit passage of a continuous wire electrode and a stream of gas from a remote source sufficient to blow molten metal away from the location of cutting or gouging with the torch;
   (b) an electrically conductive contact tip extending forwardly from the diffuser, the contact tip having a central bore sized to slidably and closely receive the wire electrode;

(c) a longitudinal nozzle extending over the diffuser and the contact tip;

(d) a collection cavity formed at least partially by the diffuser for receiving the gas stream from the remote source;

(e) a plurality of gas passageways extending longitudinally forwardly from the collection cavity, the gas passageways having outlet openings oriented to direct the individual gas streams flowing through the gas passageways toward a convergence point located forwardly of the nozzle assembly;

(f) a further comprising means for attaching the nozzle to the diffuser at a location spaced from the collection cavity, the attaching means includes a collar section snugly engaged over the diffuser at a location rearwardly of the collection cavity; and, (g) the nozzle includes a cylindrical section having a rearward internal counterbore snugly engaged over the collar and extending forwardly of the collar to define the collection cavity, the cylindrical section having a forward bore in communication with the rearward counterbore and sized to snugly engage over the diffuser at a location forwardly of the collection cavity.

9. A convergent nozzle assembly, to convert an inert gas shielded welding unit into an arc cutting and gouging torch, the conversion convergent nozzle assembly comprising:

(a) a cylindrical diffuser having a central bore sized to permit passage of a continuous wire electrode and a stream of gas from a remote source sufficient to blow molten metal away from the location of cutting or gouging with the torch;

(b) an electrically conductive contact tip extending forwardly from the diffuser, the contact tip having a central bore sized to slidably and closely receive the wire electrode;

(c) a longitudinal nozzle extending over the diffuser and the contact tip;

(d) a collection cavity formed at least partially by the diffuser for receiving the gas stream from the remote source;

(e) a plurality of gas passageways extending longitudinally forwardly from the collection cavity, the gas passageways having outlet openings oriented to direct the individual gas streams flowing through the gas passageways toward a convergence point located forwardly of the nozzle assembly;

(f) further comprising means for attaching the nozzle to the diffuser at a location spaced from the collection cavity;

(g) wherein the nozzle includes a cylindrically-shaped rearward section having an internal diameter of a size larger than the external size of the diffuser, the collection cavity being formed by the exterior of the diffuser and the internal diameter of the cylindrical section;

(h) wherein the attaching means snugly engaged with the interior of the cylindrical section and the exterior of the diffuser at a location rearwardly of the collection cavity;

(i) wherein the nozzle further including a forward nose assembly attached to the forward end portion of the cylindrical section, the gas passageways being formed in the nose assembly and being in gas receiving communication with the collection cavity; and, (j) the interior of the nose assembly snugly engaged with the contact tip.

10. The conversion convergent nozzle assembly according to claim 9, wherein the attaching means is at least in part composed of electrically insulating material to insulate the rear cylindrical section of the nozzle from the diffuser, and the nose assembly is composed at least in part of electrically insulating material to insulate the nose assembly from the contact tip.

11. The conversion convergent nozzle assembly according to claim 9, wherein the nose assembly includes:

a hollow, frustoconically-shaped nose section having a hollow rearward end attached to the forward portion of the cylinder section; and, a spacer disposed between the interior of the nose section and the contact tip, the spacer snugly engaged over the contact tip.

12. The conversion convergent nozzle assembly according to claim 11, wherein the spacer includes a frustoconically-shaped exterior to mate with a correspondingly-shaped seat formed in the interior of the nose section of the nose assembly.

13. A convergent nozzle assembly to convert an inert gas shielded welding unit into an arc cutting and gouging torch, comprising:

(a) a cylindrical diffuser having a central longitudinal bore sized to permit passage of a continuous wire electrode and a stream of gas sufficient to blow molten metal away from the location at which cutting or gouging is occurring, the diffuser also having holes extending laterally through the diffuser in communication with the central bore of the diffuser;

(b) an electrically conductive contact tip extending forwardly from the diffuser, the contact tip having a central bore sized to slidably and closely receive the wire electrode;

(c) an attachment collar snugly engaged over the diffuser at a location rearwardly of the lateral diffuser holes;

(d) a longitudinal nozzle extending over the diffuser and the contact tip, the nozzle including a cylindrical section having a rearward internal counterbore snugly engaged over the attachment collar and extending forwardly of the collar and the lateral diffuser holes to define a collection cavity within the cylindrical section in gas receiving communication with the lateral diffuser holes, the cylindrical section also having a forward bore in communication with the rear counterbore of the cylindrical section and sized to snugly engage over the diffuser at a location forwardly of the collection cavity; and, (e) a plurality of gas passageways extending through the cylindrical section forwardly from the collection cavity, the gas passageways having outlet openings oriented to direct the individual gas streams flowing through the gas passageways toward a convergence point located forwardly of the nozzle assembly.

14. The conversion convergent nozzle assembly according to claim 13, wherein the gas passageways include rear sections in fluid receiving communication with the collection cavity and forward sections angled inwardly in the forward direction.

15. The conversion convergent nozzle assembly according to claim 13, wherein the attachment collar is composed at least in part of electrically nonconductive material to electrically insulate the nozzle from the diffuser.

16. A convergent nozzle assembly to convert an inert gas shielded welding unit into an arc cutting and gouging torch, comprising:
   (a) a generally cylindrical diffuser having a central, longitudinal bore sized to permit passage of a continuous wire electrode and stream of gas sufficient to blow molten material away from the cutting or gouging site, the diffuser also having holes extending generally radially through the diffuser in communication with the central bore;
   (b) an electrically conductive contact tip extending forwardly from the diffuser, the contact tip having a central bore sized to slidably and closely receive the wire electrode;
   (c) a longitudinal nozzle extending over the diffuser and the contact tip, the nozzle having a cylindrically-shaped rearward interior portion of a diameter larger than the external size of the diffuser;
   (d) collar means for attaching the nozzle to the diffuser, the collar means snugly engaged with the rearward interior portion of the nozzle and with the exterior of the diffuser at a location rearwardly of the diffuser radial holes;
   (e) a collection cavity formed by the exterior of the diffuser and the rearward interior portion of the nozzle, the collection cavity being in gas receiving communication with the radial diffuser holes; and,
   (f) a nose assembly attached to the forward end of the nozzle and snugly engaged with the contact tip, the nose assembly having portions defining a plurality of gas passageways extending longitudinally forwardly from the collection cavity, the passageways having outlet openings oriented to direct the individual gas streams flowing through the passageways toward a convergence point located forwardly of the nozzle assembly.

17. The conversion convergent nozzle according to claim 16, wherein the nose assembly includes:
   a hollow, frustoconically-shaped section, with the rearward end of the frustoconically-shaped section attached to the forward portion of the nozzle; and,
   an air-sealing insulator disposed between the interior of the frustoconically-shaped section of the nose assembly and the contact tip, the insulator snugly engaged over the contact tip and having an exterior shape corresponding to a portion of the interior of the frustoconically-shaped section to seat against the frustoconically-shaped section.

* * * * *